US009747277B2

(12) United States Patent
Cecchi et al.

(10) Patent No.: US 9,747,277 B2
(45) Date of Patent: *Aug. 29, 2017

(54) PREDICTING INDIVIDUAL OR CROWD BEHAVIOR BASED ON GRAPHICAL TEXT ANALYSIS OF POINT RECORDINGS OF AUDIBLE EXPRESSIONS

(71) Applicant: International Business Machines Corporation, Armonk, NY (US)

(72) Inventors: Guillermo A. Cecchi, New York, NY (US); James R. Kozloski, New Fairfield, CT (US); Clifford A. Pickover, Yorktown Heights, NY (US); Irina Rish, Rye Brook, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/742,972

(22) Filed: Jun. 18, 2015

(65) Prior Publication Data

US 2016/0140984 A1 May 19, 2016

Related U.S. Application Data

(63) Continuation of application No. 14/541,663, filed on Nov. 14, 2014.

(51) Int. Cl.
*G10L 21/00* (2013.01)
*G06F 17/27* (2006.01)
(Continued)

(52) U.S. Cl.
CPC ....... *G06F 17/2765* (2013.01); *G06Q 50/265* (2013.01); *G10L 15/26* (2013.01); *G10L 21/10* (2013.01); *G10L 25/63* (2013.01)

(58) Field of Classification Search
CPC ... G06F 17/2765; G06Q 50/265; G10L 15/26; G10L 21/10; G10L 5/63
(Continued)

(56) References Cited

U.S. PATENT DOCUMENTS

2009/0222388 A1* 9/2009 Hua .................. G06N 5/02
706/12
2013/0059608 A1* 3/2013 Cuff .................. H04W 64/006
455/456.5

(Continued)

OTHER PUBLICATIONS

Guillermo A. Cecchi, et al., Predicting Individual or Crowd Behavior Based on Graphical Text Analysis of Point Recordings of Audible Expressions, U.S. Appl. No. 14/541,663, filed Nov. 14, 2014.

(Continued)

*Primary Examiner* — Thierry L Pham
(74) *Attorney, Agent, or Firm* — Cantor Colburn LLP; Alexa Ashworth (57) ABSTRACT

Embodiments relate to determining a crowd behavior. A method of determining a crowd behavior is provided. The method collects, at one or more recording points in a crowd of individuals, audible expressions that the individuals of the crowd make. The method generates a graph of the audible expressions as the audible expressions are collected from the individuals. The method determines a crowd behavior by performing a graphical text analysis on the graph. The method outputs an indication of the crowd behavior to trigger a crowd control measure.

7 Claims, 6 Drawing Sheets

(51) Int. Cl.
   *G10L 15/26*   (2006.01)
   *G06Q 50/26*   (2012.01)
   *G10L 21/10*   (2013.01)
   *G10L 25/63*   (2013.01)
   *G10L 25/00*   (2013.01)

(58) Field of Classification Search
   USPC .............................. 704/223, 225, 226, 274
   See application file for complete search history.

(56) References Cited

U.S. PATENT DOCUMENTS

2014/0149094 A1* 5/2014 Takeuchi ........... G06K 9/00778
   703/6
2014/0372348 A1* 12/2014 Lehmann ............ G06K 9/6265
   706/12

OTHER PUBLICATIONS

List of IBM Patents or Patent Applications Treated as Related; Date Filed: Jun. 18, 2015, pp. 1-2.

* cited by examiner

PREDICTING INDIVIDUAL OR CROWD BEHAVIOR BASED ON GRAPHICAL TEXT ANALYSIS OF POINT RECORDINGS OF AUDIBLE EXPRESSIONS

DOMESTIC PRIORITY

This application is a continuation of U.S. patent application Ser. No. 14/541,663, filed Nov. 14, 2014, the disclosure of which is incorporated by reference herein in its entirety.

BACKGROUND

The present invention relates generally to predicting individual or crowd behavior, and more specifically, to predicting individual or crowd behavior based on graphical text analysis of point recordings of audible expressions that the crowd make.

When a large crowd of individuals is gathered, monitoring the crowd for mounting agitation and spontaneous mayhem may be desired. This is because the transition from peaceful positive experiences shared by many individuals in the crowd to unpleasant, dangerous or unlawful mayhem can occur rapidly. To encourage the peaceful positive experiences and discourage mayhem, crowd control measures may be employed.

At various security checkpoints, an individual or a crowd that passes through a checkpoint (e.g., at the airports, sports stadiums, government buildings, etc.) are screened for possession of any objects or material that may be used to harm other individuals or a crowd. If an individual is found to possess such objects or material, additional security measures are typically employed. For instance, the individual may be asked to give up such objects or material at the security checkpoint. The individual may also be rejected at the security checkpoint or even put into custody for further investigation.

SUMMARY

Embodiments include a computer program product, a method, and a system for determining a crowd behavior. According to an embodiment of the present invention, a computer program product is provided. The computer program product comprises a computer readable storage medium having program instructions embodied therewith. The program instructions readable by a processing circuit cause the processing circuit to perform a method of determining a crowd behavior. The method collects, at one or more recording points in a crowd of individuals, audible expressions that the individuals of the crowd. The method generates a graph of the audible expressions as the audible expressions are collected from the individuals. The method determines a crowd behavior by performing a graphical text analysis on the graph. The method outputs an indication of the crowd behavior to trigger a crowd control measure.

According to another embodiment of the present invention, a method for determining a crowd behavior is provided. The method collects, at one or more recording points in a crowd of individuals, audible expressions that the individuals of the crowd make. The method generates a graph of the audible expressions as the audible expressions are collected from the individuals. The method determines a crowd behavior by performing a graphical text analysis on the graph. The method outputs an indication of the crowd behavior to trigger a crowd control measure.

According to a further embodiment of the present invention, a computer system for determining a crowd behavior is provided. The computer system comprises a memory having computer readable instructions and a processor configured to execute the computer readable instructions. The instructions comprise collecting, at one or more recording points in a crowd of individuals, audible expressions that the individuals of the crowd. The instructions further comprise generating a graph of the audible expressions as the audible expressions are collected from the individuals. The instructions comprise determining a crowd behavior by performing a graphical text analysis on the graph. The instructions comprise outputting an indication of the crowd behavior to trigger a crowd control measure.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

In some embodiments of the invention, the systems and methods perform a graphical text analysis on the audible expressions of a crowd of individuals in order to predict behavior of the crowd. More specifically, the systems and methods identify a cognitive state of an individual, a cognitive state of a group of individuals in the crowd, and/or a cognitive state of the crowd as a whole based on the graphical text analysis of the audible expressions and then determine a crowd behavior (e.g., a likelihood of, prediction for, or tendency toward an impending stampede, act of terrorism, compressive asphyxiation, riot, trampling, violent confrontation, etc.) based on the identified cognitive states. In some embodiments, the audible expressions that the individuals of the crowd make include spoken words, utterances, sighs, exclamations, and any other sounds that may be converted to text.

The determined crowd behavior may provide an alert to personnel who implement a crowd control measure to deter the crowd behavior if necessary. A crowd control measure in disclosure refers to any measure aimed at moving a crowd from a state of higher risk to a state of lower risk. For instance, in some embodiments, crowd control measures include announcements encouraging calm, direction for crowd movement, playing of music, and deployment of active agents into the crowd to calm and encourage the crowd. The systems and methods may also determine an individual behavior based on the identified cognitive states. The determined individual behavior may provide a checkpoint security warning, or trigger additional screening at a security checkpoint.

The individuals of the crowd may go through different cognitive states while they are gathered. These cognitive states may include interests, current knowledge, goals, desires, emotional states (e.g., agitation, anger, confusion, panic, frustration, inebriation, irritation, happiness, satisfaction, etc.), to name a few. These cognitive states may be revealed implicitly or explicitly through the audible expressions that the individuals utter.

Some embodiments of the invention may be implemented in a cloud computing environment. Specifically, for example, graphical text analysis on the audible expressions of a crowd of individuals may be performed in a crowd computing environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
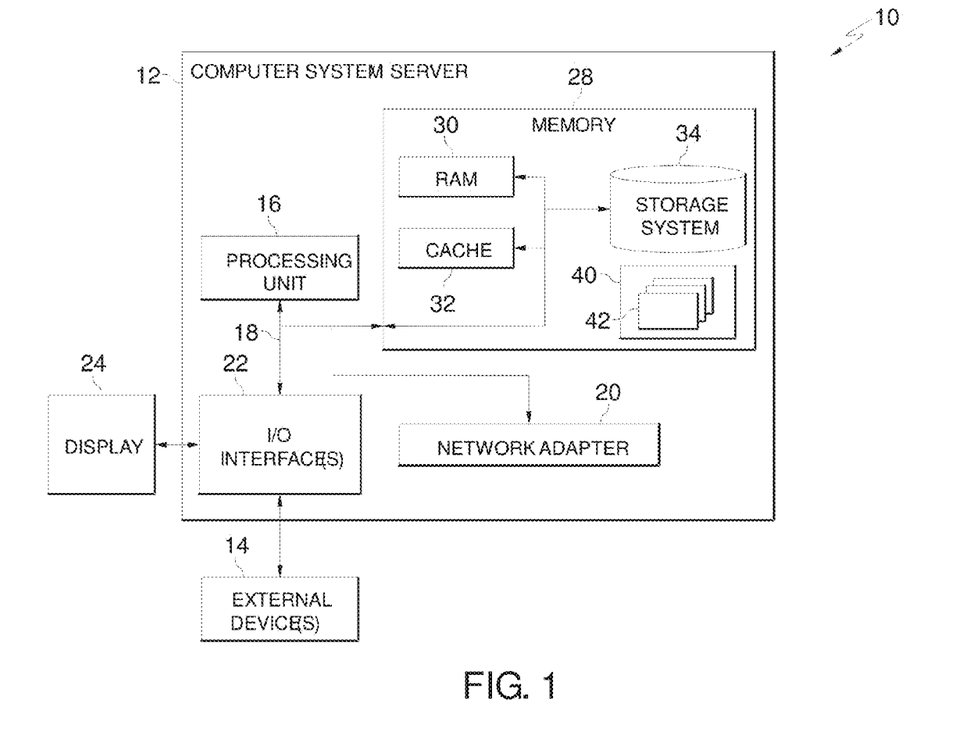
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
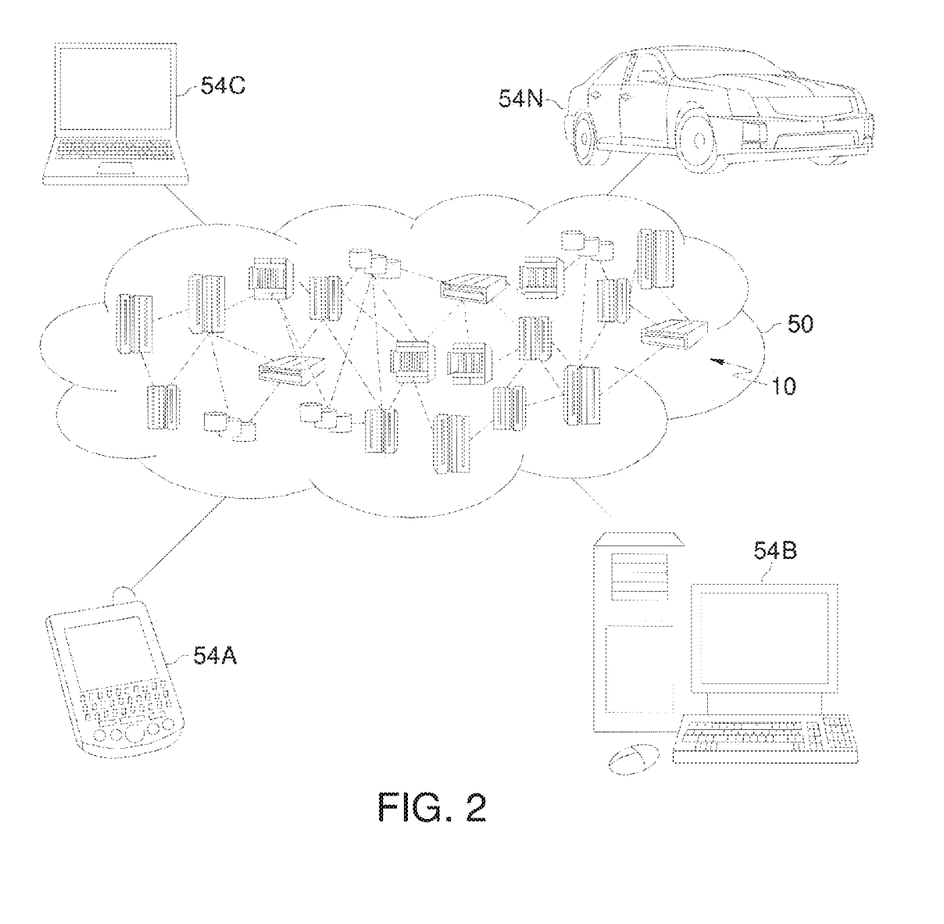
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
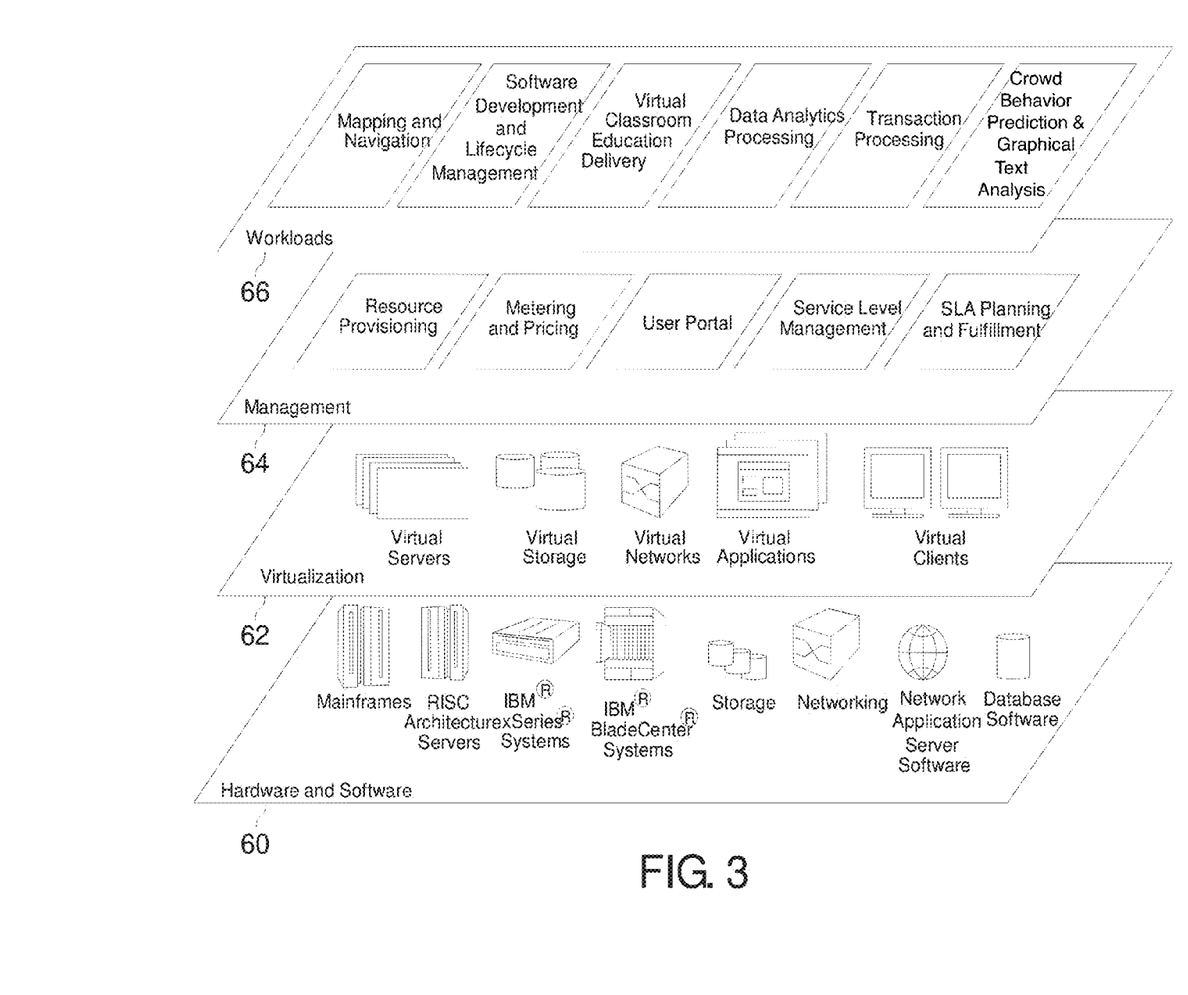
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and crowd behavior prediction and graphical text analysis.

Figure 4:
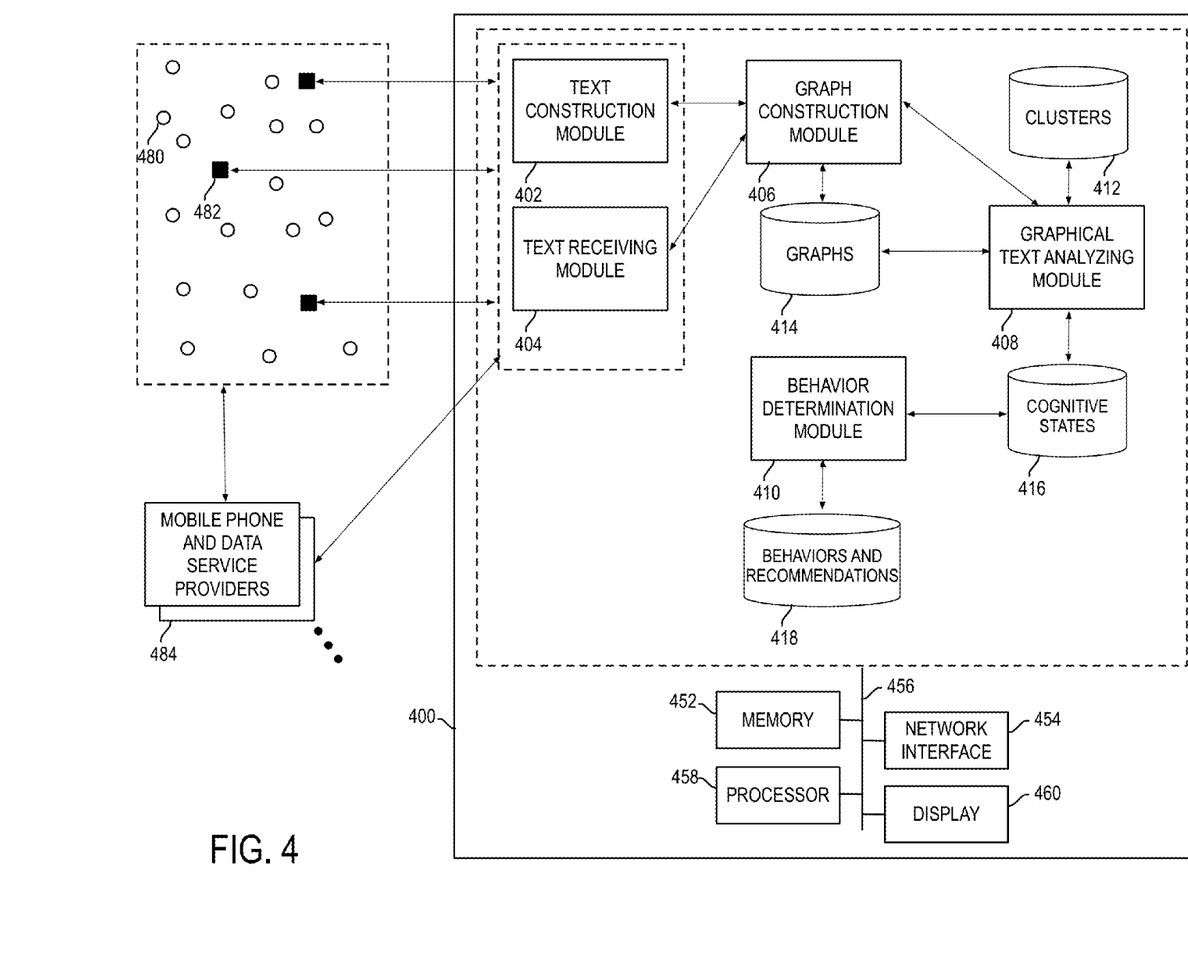
FIG. 4 depicts a system for determining a crowd behavior according to an embodiment of the invention.

FIG. 4 illustrates a system 400 for determining a crowd behavior. In some embodiments, the system 400 includes modules, sub-modules and datastores such as a text generation module 402, a text receiving module 404, a graph constructing module 406, a graphical text analyzing module 408, a behavior determination module 410, a clusters repository 412, a graphs repository 414, a cognitive states repository 416, and a behaviors and recommendations repository 418. FIG. 4 also illustrates a crowd of individuals 480, a set of recording points 482, and mobile phone and data service providers 484.

The individuals 480 make up a crowd of individuals of which a behavior is determined. The crowd represents a large number of people gathered close to each other in crowded places. For example, the crowd may represent the people gathered at a demonstration, at a political rally, at a religious pilgrimage, at a sporting event, at a music concert, at a subway station, at a mall, at a public celebration at a park, etc. In some cases, the crowd may also represent the people passing through a security checkpoint at an airport, at a government building, a sports stadium or arena, etc.

One or more recording points 482 that collect the audible expressions of the individuals are within the crowd. A recording point includes a microphone to collect the audible expressions as audio signals. In some embodiments, a recording point coverts the audio signals of the audible expressions into text using one or more known speech-to-text techniques. A recording point sends the audio signals or the converted text to the system 400. In some embodiments, the audio signals and the converted text include one or more identifiers for the individuals and/or recording points and the location information (e.g., global positioning system (GPS) coordinates, locations in a predefined map of the crowd, etc.) of the individuals or recording points.

In some embodiments, the relative position between a recording point and the individuals of the crowd may change. For instance, a recording point may move or rove within the crowd to reach different parts of the crowd. A recording point may be stationary, and the individuals of the crowd may approach or pass through the recording point. For instance, a recording point is a security checkpoint of a place (e.g., an airport, a government building, a sports stadium), where a number of individuals of a crowd may need to approach and pass through.

In some embodiments, the audible expressions of the individuals of the crowd may be collected through one or more mobile phone and data service providers 482. That is, the phone calls of the individuals of the crowd are directed to the system 400 via the mobile phone and data service providers 484. In some embodiments, the text messages that the individuals of the crowd send out using their mobile devices (e.g., smartphones, tablets, etc.) are also directed to the system 400. It is assumed that the individuals agreed with the mobile phone and data service providers 484 and/or other social network service providers and text messaging service providers to have their phone calls and/or text messages be directed to the system 400. It is also assumed that these service providers and the administrators or users of the system 400 have agreed to send and receive the phone calls and/or the text messages.

The text generation module 402 transcribes the audible expressions into text. Specifically, the text generation module 402 converts the audio signals of the audible expressions of the individuals 480 into text. The text generation module 402 may use one or more known speech-to-text techniques for converting audio signals of the audible expressions into text. The audio signals may be received from the individuals via a network such as the Internet (not shown), via the mobile phone and data service providers, or from one or more microphones at the recording points in the crowd. In some embodiments, the text generation module 402 may insert one or more identifiers into the text data to indicate the sources (i.e., individuals or recording points) of the expressions in the text. The text generation module 402 may also insert location information of the sources.

The text receiving module 404 receives the audible expressions of the individuals in text. The text of the audible expressions may be received from the recording points that are capable of converting audio signals into text. The text receiving module 404 may also receive the text messages from the individuals' mobile devices via the mobile phone and data service providers 481. The text receiving module 404 may also insert one or more identifiers and/or location information into the text data.

The graph constructing module 406 receives the text of the individuals' audible expressions from the text generation module 402 and/or the text receiving module 404. The graph constructing module 406 then builds a graph from the received text. In some embodiments, the graph constructing module 406 builds one graph that includes audible expressions of all of the individuals of the crowd as a whole collected at all recording points. Alternatively or conjunctively, the graph constructing module 406 builds one graph for the audible expressions collected at each recording point or one graph for each individual of the crowd.

More specifically, in some embodiments, the graph constructing module 406 extracts syntactic features from the received text and converts the extracted features to vectors. These syntactic vectors can have binary components for the syntactic categories such as verb, noun, pronoun, adjective, lexical root, etc. For instance, a vector [0, 1, 0, 0 . . . ] represents a noun-word in some embodiments.

The graph constructing module 406 may also generate semantic vectors from the received text using one or more known techniques (e.g., Latent Semantic Analysis and WordNet). The semantic content of each word in the text may be represented by a vector, of which the components are determined by Singular Value Decomposition of word co-occurrence frequencies over a large database of documents.

Figure 5:
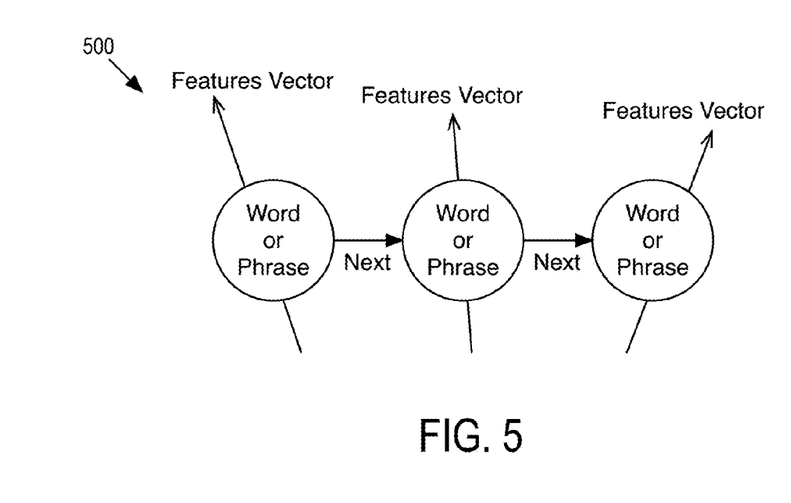
FIG. 5 depicts a graph of words according to an embodiment of the invention.
Figure 6:
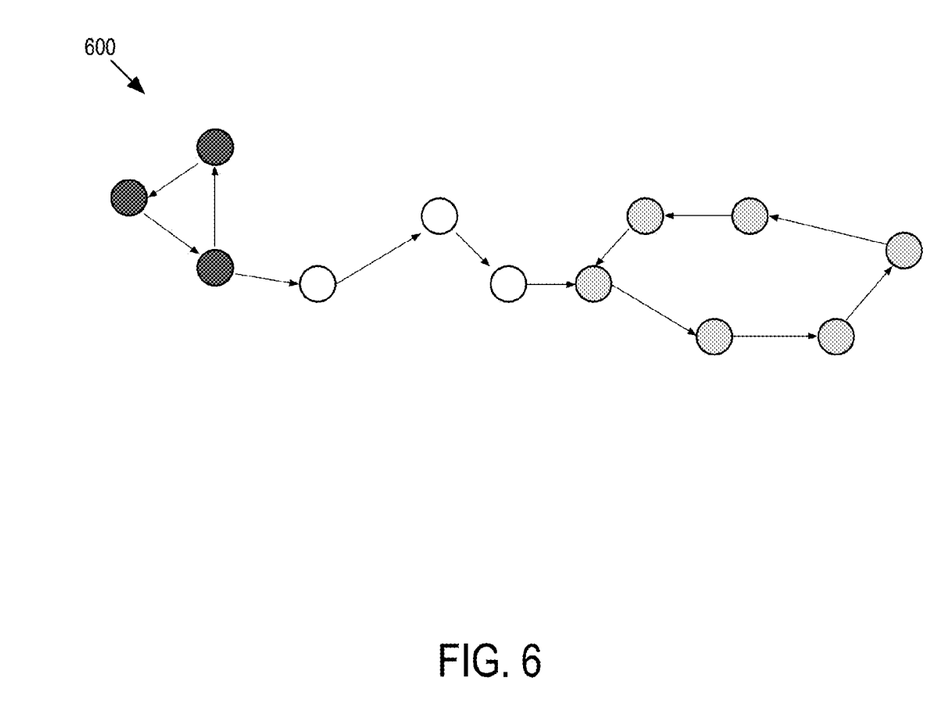
FIG. 6 depicts a graph of words according to an embodiment of the invention.

A graph generated for the crowd by the graph constructing module 406 may be in the form of: $G=\{N, E, \breve{W}\}$, where the nodes N represent tokens (e.g., words or phrases), the edges E represent temporal precedence in the audible expressions, and each node possesses a feature vector $\breve{W}$ defined in some embodiments as a direct sum of the syntactic and semantic vectors and additional non-textual feature vector (e.g., a predetermined vector for the identity of the individual). That is, in some embodiments, the feature vector $\breve{W}$ is defined by the equation: $\breve{W}=\breve{w}_{sym} \oplus \breve{w}_{sem} \oplus \breve{w}_{ntxt}$, where $\breve{W}$ is the feature vector, $\breve{w}_{sym}$ is the syntactic vector, $\breve{w}_{sem}$ is the semantic vector, and $\breve{w}_{ntxt}$ is the non-textual features. An example graph 500 that may be generated by the graph constructing module 406 is shown in FIG. 5. As shown, the graph 500 is a directed graph that includes an ordered set of words or phrases, each with a feature vector. Loops may form in this graph if the same words or phrases are spoken more than once. FIG. 6 partially illustrates an example graph 600. The graph 600 may represent a graph for the crowd as a whole or for a group of individuals of a crowd whose audible expressions are gathered at one recording point. The nodes of the graph 600 may include information about the identities of the individuals and/or the identifiers of the recording points. For example, the nodes depicted in black, white and grey may represent the words gathered at three different recording points or the words of three different individuals in the group.

Referring back to FIG. 4, the graph constructing module 406 updates the graph as more text from the individuals of the crowd is received from the text generation module 402 and/or the text receiving module 404. The graph constructing module 406 stores the generated graphs in the graphs repository 422.

The graphical text analyzing module 408 uses one or more machine learning tools and techniques known in the art to extract topological features from the graph and makes inferences about the cognitive state of the crowd, a group of individuals of a crowd, or an individual of the crowd. The crowd, as a whole or a group of individuals of the crowd, represents a super-organism, a hive mind, or a composite person that is reflective of more than one individual.

The graphical text analyzing module 408 performs a graphical text analysis on each graph generated by the graph constructing module 406. As a specific example of graphical text analysis, in some embodiments, the graphical text analyzing module 408 analyzes the graph G generated by the graph construction module 406 based on a variety of features. The variety of features include known graph-theoretical topological measures of the graph skeleton (i.e., a graph without features vectors: $G_{Sk}=\{N, E\}$) such as degree distribution, density of small-size motifs, clustering, centrality, etc. Similarly, additional values may be extracted by including the features vectors for each node of the graph. One such instance is the magnetization of the generalized Potts model (e.g., $H=\Sigma_n E_{nm} \breve{W}_n^\intercal \breve{W}_m$) such that temporal proximity (e.g., number of edges between two nodes) and feature similarity are taken into account. These features, which incorporate the syntactic, semantic and dynamical components of the audible expression, are then combined as a multi-dimensional features vector $\breve{F}$ that represents a audible expression sample. This feature vector is finally used to train a standard classifier: $M=M(\breve{F}_{train}, C_{train})$, to discriminate audible expression samples that belong to different conditions C, such that for each text audible expression sample the classifier estimates its condition identity based on the extracted features: $C(sample)=M(\breve{F}_{sample})$.

In some embodiments, the graphical text analyzing module 408 compares the graph with the clusters of previously generated graphs stored in the clusters repository 420. More specifically, the feature vectors of previously generated graphs with known cognitive states are plotted in a multi-dimensional text feature space to form clusters in that space. The graphical text analyzing module 408 plots the feature vectors of the graph for the individual in the space in order to determine whether the graph belongs to a cluster based on, e.g., distance between the plots of the graph and the plots of the clusters. If the plots of the graph fall in the feature space of a particular cluster, the corresponding cognitive state represented by the cluster is determined as the cognitive state of the crowd, the group of individuals of the crowd, and/or the individual. As such, the graphical text analysis is not keyword based. That is, the cognitive states are not determined based on whether one or more keywords are included in the audible expressions.

The graphical text analyzing module 408 stores the identified cognitive state in the cognitive states repository 424. In some embodiments, the cognitive states repository 424 stores a history of cognitive states for the crowd, the group of individual of the crowd, and/or the individual. In some embodiments, the graphical text analyzing module 408 may discard or anonymize the graphs of the words stored in the graphs 414 for reasons of privacy, after graphical text analysis is performed on those graphs.

The behavior prediction module 410 monitors the cognitive states of the crowd, a group of individuals, or an individual and detects a transition from one cognitive state to another for the crowd, the group of individuals or the individual. In some embodiments, the behavior prediction module 410 may also predict the cognitive state by building statistical models to identify likely transitions of cognitive states. For instance, the behavior prediction module 410 may build a Markov model with probabilities of a transition and uses the model to characterize the transition based on the topologies of the graphs or composite graphs.

The behavior prediction module 410 uses the cognitive states and the transitions between the cognitive states to predict a behavior of the crowd, a group of individuals of the crowd, or an individual. Specifically, the behavior prediction module 410 analyzes, compares and clusters the cognitive states and the transitions to predict behaviors. For instance, if the cognitive states indicate frustration and agitation, the behavior prediction module 410 may predict a destructive behavior. As another example, if the cognitive states indicate confusion and desire for directions, the behavior prediction module 410 may predict a guidance seeking behavior. Thus, the functioning of the system 400, a computing device, may be improved.

Based on the predicted behaviors, the behavior prediction module 410 may optionally generate alerts or recommend one or more security, assistance, or crowd control and management measures (e.g., deploying barriers, opening a door, providing instructions, providing calming messages, deploying drones to monitor, instruct, and assist, etc.) to deter the predicted behaviors or provide guidance or needs to the crowd. Based on the predicted behaviors and the recommendations, the users of the system 400 may design specific control and assistance measures such as public announcements or evacuation schemes to minimize any risk. In some embodiments, the alerts that the behavior prediction module 410 generates include maps of a crowd, with coloration used to indicate possible areas of risky behavior or areas of probable safety and harmony.

In some embodiments, the behaviors and recommendations repository 418 stores a history of predicted behaviors, a history of recommended measures, a history of implemented measures, and the usefulness of the implemented measures in the context of crowds. In some embodiments, the system 400 allows the users to edit and populate the repository 418 with the information regarding the measures implemented. The behavior prediction module 410 may use the histories stored in the repository 418 to improve accuracy of the prediction and to recommend more useful measures.

When the recording point that collects the audible expressions of an individual is a security checkpoint, the behavior prediction module 410 uses the predicted behavior of this individual to provide a warning or trigger additional screening. If this individual is one of a group of individuals that, e.g., travel together, the cognitive states of this group as a whole is determined and analyzed to predict their behavior.

As used herein, the terms module and sub-module may refer to an application specific integrated circuit, an electronic circuit, a processor (shared, dedicated, or group) and memory that executes one or more software or firmware programs, or a combinational logic circuit in a server. For example, in some embodiments, the text generation module 402 may be communicatively connected (e.g., through a bus 456) to a memory 452 to store and retrieve the audio signals and the text converted from the audio signals, and to a network interface 454 to communicate with the mobile phone and data service providers 482. The behavior prediction module 410 may use a display 460 to output an indication of the predicted behaviors and/or recommended measures. The graph constructing module 406 may use a processor 458 to construct graphs from the text. The graphical text analyzing module 408 may also use the processor 458 to perform a graphical text analysis on the graphs. Moreover, the repositories 412, 414 and 416 may be implemented in the memory 452. In some embodiments, the modules of the system 400, namely the text generation module 402, the text receiving module 404, the graph constructing module 406, the graphical text analyzing module 408, the behavior determination module 410 may be combined or further partitioned. The modules of the system 400 may be implemented in more than one physical machine in a distributed fashion.

Figure 7:
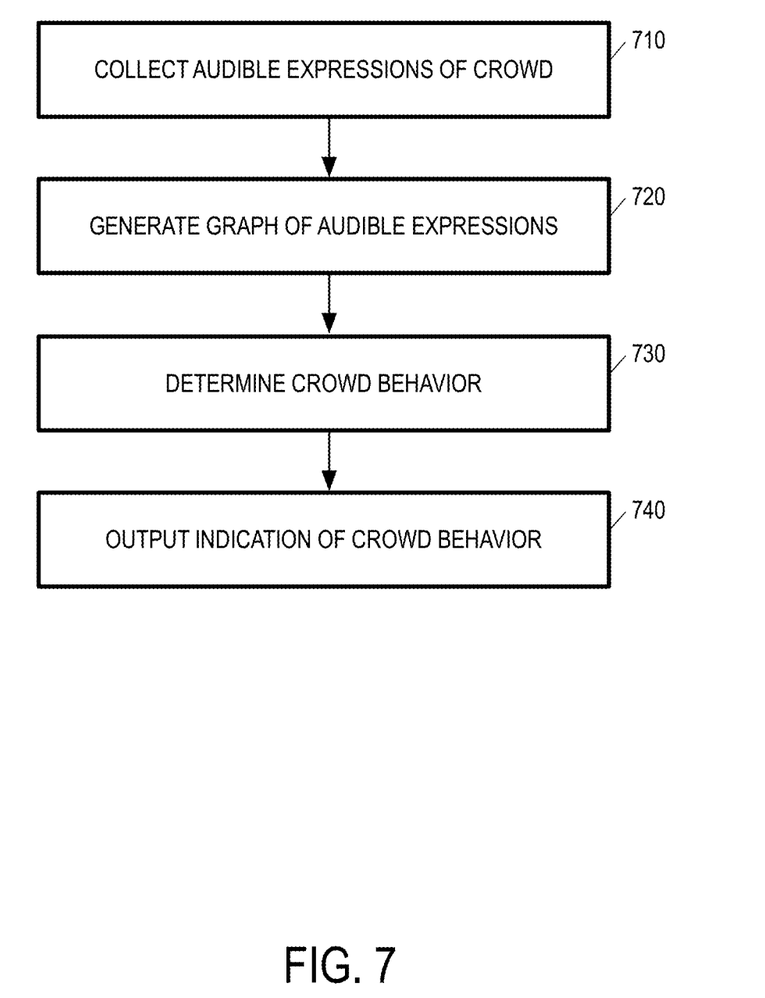
FIG. 7 depicts a process flow for determining a crowd behavior according to an embodiment of the invention.

FIG. 7 illustrates a process flow for predicting a crowd behavior. In some embodiments, the system 400 performs the process flow shown in FIG. 7. At block 710, the system 400 collects, at one or more recording points in a crowd of individuals, audible expressions that the individuals of the crowd make. Specifically, the system 400 receives audible expressions from the individuals in text or in audio. The system 400 converts any audible expressions in audio into text in real time. The system 400 captures an order in which the audible expressions are received in the graph. In some embodiments, the recording points move or rove in the crowd to collect audible expressions. Alternatively or conjunctively, the recording points are stationary, and the audible expressions of the individuals are collected as the individuals approach or pass by the recording points. The recording points may include a screening checkpoint or a security checkpoint. The system 400 may collect audible expressions also from phone calls that the individuals make, via one or more mobile phone and data service providers.

The system 400 may also collect text messages that the individuals send, via one or more mobile phone and data service providers.

At block 720, the system 400 generates a graph (e.g., the graph 600) of the audible expressions as the audible expressions are collected from the individuals. At block 730, the system 400 determines a crowd behavior by performing a graphical text analysis on the graph. Specifically, the system 400 performs the graphical text analysis on the graph generated at block 720 to identify at least one of a cognitive stage of each individual, a cognitive state of a group of individuals of the crowd, and a cognitive state of the crowd as a whole. The system 400 determines the crowd behavior based on the identified cognitive state.

At block 740, the system 400 outputs an indication of the crowd behavior to trigger a crowd control measure. Specifically, in some embodiments, the system 400 uses the crowd behavior as a risk metric and triggers one or more crowd control measures if the measured risk is above a threshold. A crowd control measure is any measure aimed at moving a crowd from a state of higher risk to a state of lower risk. In some embodiments, a crowd control measure is for deterring the crowd behavior if the crowd behavior is determined to be a risk. For instance, in some embodiments, such crowd control measures include warnings to the crowd, blocking or allowing paths for crowd movement, and deployment of personnel into the crowd to deter risky behavior. A crowd control measure may also be for assisting the crowd in minimizing a risk the crowd behavior has. For instance, in some embodiments, such crowd control measures include direction for crowd movement, playing of music, announcements encouraging calm and order, and deployment of personnel into the crowd to calm and encourage the crowd.

In some embodiments, the system 400 provides an alert to an individual who implements the crowd control measure based on the alert. For example, an alert may take a form of audio and/or visual indication of the measured risk. When receiving such an alert, the individual can decide whether to take any crowd control measures and which crowd control measures to take.

The system 400 may trigger a warning or additional screening for an individual when the individual approaches and/or passes through a screening checkpoint. For instance, the system 400 may display a predefined message for the security officer to view when the individual's behavior is determined or predicted to be risky so that the security officers can take additional screening measures on the individual, The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining a crowd behavior, comprising:
    collecting, via a computer processor, at one or more recording points in a crowd of individuals, audible expressions that the individuals of the crowd make;
    generating, via a computer processor, a graph of the audible expressions as the audible expressions are collected from the individuals, wherein the graph comprises nodes that represent tokens and edges that represent temporal precedence in the audible expressions;
    determining, via a computer processor, a crowd behavior by performing a graphical text analysis on the graph; and outputting, via a computer processor, an indication of the crowd behavior to trigger a crowd control measure, wherein the crowd behavior comprises a risk metric, and wherein the crowd control measure is triggered when the risk metric is above a threshold.

2. The method of claim 1, wherein the determining comprises:
performing the graphical text analysis on the graph to identify at least one of a cognitive stage of each individual, a cognitive state of a group of individuals of the crowd, and a cognitive state of the crowd as a whole; and
determining the crowd behavior based on the identified cognitive state.

3. The method of claim 1, wherein the crowd control measure is for deterring the crowd behavior if the crowd behavior is determined to be a risk.

4. The method of claim 1, wherein the outputting comprises providing an alert to an individual who implements the crowd control measure.

5. The method of claim 1, wherein the at least one of the recording points moves in the crowd.

6. A computer-implemented method for determining a crowd behavior, comprising:
collecting, via a computer processor, at one or more recording points in a crowd of individuals, audible expressions that the individuals of the crowd make;
generating, via a computer processor, a graph of the audible expressions as the audible expressions are collected from the individuals, wherein the graph comprises nodes that represent tokens and edges that represent temporal precedence in the audible expressions;
determining, via a computer processor, a crowd behavior by performing a graphical text analysis on the graph;
outputting, via a computer processor, an indication of the crowd behavior to trigger a crowd control measure;
collecting audible expressions from phone calls that the individuals make; and
using the audible expressions collected from the phone calls to generate the graph.

7. The method of claim 1, further comprising:
collecting text messages that the individuals send; and
using the text messages to generate the graph.

* * * * *